2,799,461

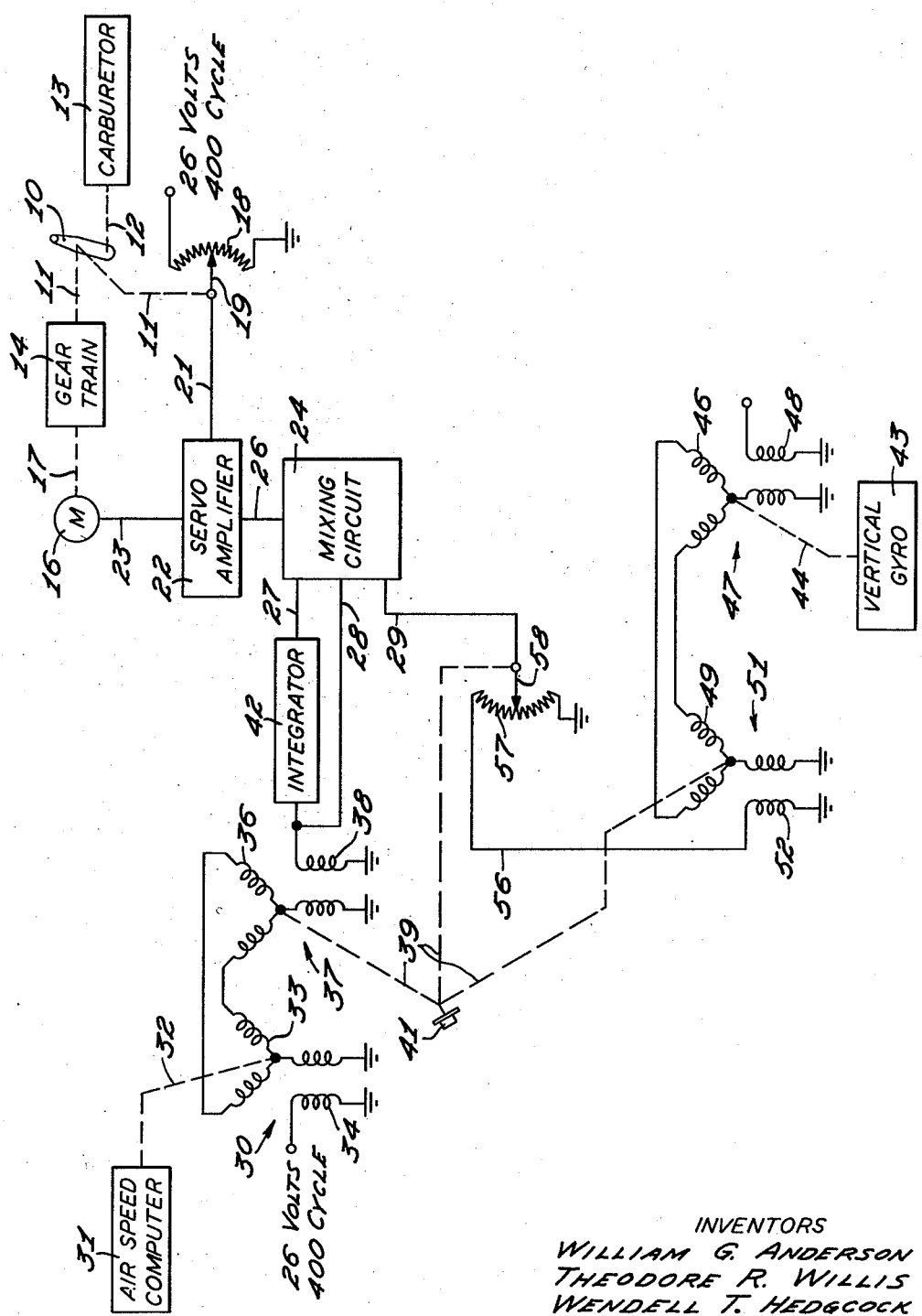

AUTOMATIC AIR SPEED CONTROL

William G. Anderson, Theodore R. Willis, and Wendell T. Hedgcock, Cedar Rapids, Iowa, assignors to Collins Radio Company, Cedar Rapids, Iowa, a corporation of Iowa Application May 28, 1954, Serial No. 432,986

5 Claims. (Cl. 244—77)

This invention relates in general to an automatic air speed control for an aircraft.

As the control of aircraft becomes more and more automatic it has become desirable oftentimes to maintain constant air speed. To maintain constant air speed independent of the plane's attitude simplifies the control problem in that the response of the aircraft's controls varies as a function of the velocity squared. Thus, if air speed varies, the entire control system will be complicated by varying parameters.

It is an object of the present invention to control the air speed of an aircraft by changing the throttle setting in response to pitch angle, air speed error and the integral of air speed error.

The commonly used air speed feedback by itself is not sufficient to reduce errors to zero in maneuvering flight. This invention utilizes pitch in the throttle control as an open loop feed to indicate the thrust needed to maintain constant air speed. For example, if the nose of the craft is raised above the horizon, more power must be added to maintain the same air speed. Likewise, if the nose is positioned below the horizon, the throttle must be reduced or air speed will increase.

An air speed feedback is used in this invention because it is beneficial in compensating for horizontal gusts. Also, the integral of the air speed error is used so as to compensate for maladjustments and unpredictable errors.

The effects of landing gear and flaps may be compensated for by providing switches which are controlled by the landing gear and flaps when they are lowered so as to change the dynamic equations of the particular aircraft.

When the desired air speed is changed, the required pitch angle feed for constant air speed during varying flight path angles is changed. For this reason, a desired air speed control knob also changes the gain in the pitch angle feed by means of an air-speed-compensating potentiometer.

The sum of these various control signals is fed into the throttle servo which is mechanically connected to the throttle through a gear train. A potentiometer is connected to the carburetor so that the voltage on the potentiometer arm will indicate the steady state power change the engine will develop. Since in the final steady state the air speed will be constant, this power is also proportional to thrust. There are certain dynamics involved in the transfer of throttle to thrust and these may be eliminated to a large extent by a proper adjustment to the characteristics of the throttle servo. It is to be realized, of course, that the dynamics of the problem are dependent upon the particular type of aircraft and the gains must be adjusted for the particular aircraft being utilized.

The gust response of the system will be good for the following reasons:

1. Horizontal gusts will cause a thrust change that will oppose the lift change due to the change in air speed. If the gust persists, the air speed will be corrected to the desired air speed.

2. In order to maintain constant altitude in vertical gusts, the plane must pitch into the gust. If this happens, the power requirement for constant air speed change is proportional to the pitch change. Hence, the pitch feed will compensate for this.

Advantages of the present system are:
1. It is good for all air speeds.
2. The pitch angle compensates for flight path angle change.
3. The pitch angle feed improves vertical gust response.
4. The integrator takes care of gear and flap position.

Further objects, features and advantages of this invention will become apparent from the following description and claims when read in view of the drawing, in which:

The figure illustrates the apparatus of this invention.

The figure illustrates an air speed control system for an aircraft which has a throttle 10 pivotably mounted on a shaft 11. The throttle 10 is linked by the linkage 12 to a carburetor 13 that is connected to the power plant of the aircraft. It is to be realized of course that the power plant may be any type of aircraft power plant which may be controlled by a throttle lever 10. For example, a rocket or jet power plant would not have a carburetor, but there would be an equivalent metering system which the throttle lever 10 would control.

The shaft 11 is connected to a gear train 14 which receives a shaft input from a motor 16 through the shaft 17.

A resistor 18 has one side connected to ground and the other side connected to a suitable exciting voltage, as for example, 26 volts 400 cycles. The shaft 11 supports a slide contact 19 which engages the resistor 18. A lead 21 is connected to the contact 19 and supplies an input to a servo amplifier 22. The servo amplifier 22 supplies an electrical input to the motor 16 through the lead 23. A mixing circuit 24 supplies an electrical input to the servo amplifier 22 through the lead 26.

The mixing circuit 24 receives three inputs through the leads 27, 28 and 29 respectively which are proportional to the integral of air speed error, the air speed error and the corrected pitch.

The air speed error signal is obtained from an air speed computer 31 which may be of a well known type, as for example, a bellows driven computer which has an output shaft 32 that positions the rotor 33 of a synchro transmitter 30.

The stator 34 of synchro transmitter 30 is energized by suitable exciting voltage, as for example, 26 volts 400 cycles. The synchro transmitter 30 has its rotor windings 33 connected to the rotor windings 36 of a synchro transformer 37. A stator winding 38 of transformer 37 has an output developed across it.

A shaft 39 is connected to the rotor 36 of the transformer 37 and a knob 41 is connected to it to position it to a desired air speed setting. The voltage developed across winding 38 will be proportional to the air speed error which is the difference between the computed air speed as determined by the computer 31 and the desired air speed as determined by the setting of the knob 41. The lead 28 is connected across the winding 38 and supplies the air speed error signal to mixing circuit 24.

An integrator 42 is also connected across the winding 38 and integrates the air speed error to produce an output proportional to the integral of air speed error which is supplied to the mixing circuit 24 through the lead 27.

The pitch channel comprises a vertical gyro 43 which may be of a type well known to those skilled in the art. The vertical gyro has an output shaft 44 which is positioned in response to the relative motion about the pitch axis between the aircraft and the gyro.

The shaft 44 is connected to the rotor 46 of a synchro transmitter 47 which has a stator winding 48. A stator winding 48 is energized by a suitable alternating voltage. A rotor 49 of another synchro transformer 51 is connected to the rotor winding 46 of the transformer 47. A stator winding 52 of the transformer 51 is coupled to the rotor winding 49 and produces an output signal.

The shaft 39 is connected to the rotor 49 of the synchro transmitter 51 and the knob 41 is attached to the end thereof.

A lead 56 connects the stator winding 52 to one end of a variable resistor 57 which has its opposite side grounded. A variable slide contact 58 engages the resistor 57 and supplies an electrical input to the mixing circuit 24 through the lead 29. Shaft 39 is also connected to the slide contact 58. Thus, contact 58 may be adjusted by the knob 41.

The resistor 18 may be wound so as to conform to the characteristic between the throttle-lever 10 and the power developed by the power plant of the aircraft. Stated otherwise, it is possible that the same increase in horsepower will not be obtained for all positions of the throttle lever with the same amount of angular motion. Therefore, the resistor 18 may be wound to compensate for this lack of linearity. This is apparent to those skilled in the art and for a more detailed description, see the patent to J. D. Ryder, Patent No. 2,275,317 which issued on March 3, 1942, entitled "Measuring and Controlling Apparatus."

It is to be noted that the desired airspeed knob 41 is connected by the shaft 39 to the contact 58. The resistor 57 may be wound in a nonlinear fashion if the aircraft's characteristic is such that the relationship between air speed and pitch is nonlinear.

In operation, let it be assumed that the aircraft is flying straight and level at a desired air speed and pitch. The desired air speed may be adjusted by the knob 41 and this will adjust rotor 49 and contact 58 to the correct position.

The gust response of this system is good for the following reasons: First, a horizontal gust will cause a thrust change that will oppose the lift change due to the change in air speed. If the gust persists, the air speed will be corrected to the desired air speed. Second, in order to maintain constant altitude in a vertical gust, the plane must pitch into the gust. If this happens the power requirements for constant air speed change proportional to the pitch change. Hence, the pitch feed will require this.

The important points in this control are:
1. It is good for all air speeds.
2. Pitch angle compensates for flight path angle change.
3. Pitch angle feed improves vertical gusts response.
4. The integrator takes care of gear and flap position.

Thus, it is seen that this invention provides a system for maintaining a constant air speed and constant pitch which may be set in as desirable.

Although this invention has been described with respect to particular embodiments thereof, it is not to be so limited as changes and modifications may be made therein which are within the full intended scope of the invention, as defined by the appended claims.

We claim:

1. An automatic airspeed control for an aircraft comprising, a throttle mounted on said aircraft, a power plant controlled by said throttle, a first shaft attached to said throttle, a first resistor, a first contact engageable with said first resistor and attached to said first shaft, a motor with its output shaft connected to said throttle, a mixing circuit supplying an input to said motor, said first contact supplying an input to said motor, an airspeed error calculator, a desired airspeed shaft attached to said airspeed error calculator, the output of said airspeed error calculator producing an airspeed error voltage, an integrator, said airspeed error voltage connected to said mixing circuit and to said integrator, said integrator output connected to said mixer, a second resistor, a second slide contact engageable with said second resistor, said desired airspeed shaft connected to said second slide contact, a pitch-error computer supplying an electrical output to said second resistor proportional to the pitch-error, said desired airspeed shaft connected to said pitch-error computer, a vertical gyro attached to said pitch-error computer, and the second slide contact connected to the mixing circuit.

2. An automatic airspeed control for an aircraft comprising, a throttle mounted on said aircraft, a motor with its output shaft connected to said throttle, a mixing circuit supplying an input to said motor, means for computing an airspeed-error signal which is the difference between the actual airspeed and the desired airspeed, means for computing a signal proportional to the pitch-error equal to the difference between the actual pitch and the desired pitch, and means for adjusting the gain in the means for computing a signal proportional to pitch-error in response to changes in the desired airspeed, and said pitch-error and airspeed error means supplying inputs to said mixing circuit.

3. A constant airspeed control for an aircraft comprising, an airspeed computer producing a shaft output proportional to the actual airspeed, a first synchro-transmitter connected to the airspeed shaft of said airspeed computer, a second synchro-transmitter connected to the first synchro-transmitter to transfer thereto the position-sensed voltage generated by said first synchro-transmitter, a desired airspeed knob connected to position the second synchro-transmitter, an integrator connected to the output voltage of the second synchro-transmitter, a mixing circuit receiving an output from said second synchro-transmitter and an output from the integrator, a vertical gyro, a third synchro-transmitter mechanically connected to the output of the vertical gyro, a fourth synchro-transmitter mechanically connected to the desired airspeed shaft, the third and fourth synchro-transmitters connected together to transfer the position-sensed voltage generated by said third synchro-transmitter, the output voltage of the fourth synchro-transmitter connected to a variable resistor, a slide contact contacting said variable resistor, said desired airspeed shaft connected to move the slide contact, said slide contact electrically connected to the mixing circuit, a motor connected to the mixing circuit and a throttle connected to the motor.

4. A constant airspeed control for an aircraft comprising, means for computing an airspeed error which is the difference between the desired and the actual airspeed of the aircraft, means for producing a pitch-error which is the difference between the actual pitch and the desired pitch, pitch compensating means comprising a resistor with a slide contact engageable therewith, said airspeed-error computing means mechanically connected to said slide contact, said pitch-error computing means electrically connected to said slide resistor, and a mixing circuit receiving the output of the slide contact and the airspeed computing means, a motor connected to the output of the said mixing circuit and a throttle connected to the output shaft of said motor.

5. An automatic airspeed control for an aircraft comprising, a throttle mounted on said aircraft, a motor with its output shaft attached to said throttle, a first throttle position feed-back contact connected to said output shaft of said motor and supplying an electrical input to said motor, an airspeed computer with an output shaft which position is proportional to the airspeed, a first synchro-transformer connected to the output shaft of the airspeed computer, a second synchro-transformer electrically connected to the first synchro-transformer, a desired airspeed control knob connected to the second synchro-transformer, a mixing circuit with its output connected to the motor, the output voltage of the second synchro-transformer connected to the mixing circuit, an integrator connected to the output voltage of the second synchro-transformer, the output voltage of the integrator connected to the mixing circuit, a compensating potentiometer comprising a resistor and slide contact, said slide contact connected to the desired airspeed knob, said slide contact electrically connected to an input of the mixing circuit, a fourth synchro-transformer with its output voltage connected to the resistor, the desired airspeed control knob connected to the fourth synchro-transformer, a third synchro-transformer electrically connected to the fourth synchro-transformer, and a vertical gyro connected to move the third synchro-transformer.

References Cited in the file of this patent

UNITED STATES PATENTS

| | | |
|---|---|---|
| 2,387,795 | Isserstedt | Oct. 30, 1945 |
| 2,664,254 | Henderickson | Dec. 29, 1953 |
| 2,701,111 | Schuck | Feb. 1, 1955 |